United States Patent [19]

Agathos

[11] Patent Number: 5,001,988
[45] Date of Patent: Mar. 26, 1991

[54] FIXED PUSHER DOLLIE

[76] Inventor: Ted Agathos, 188 Wilkinson Dr., Unit 8, Brampton, Ontario, Canada, L6T 4W9

[21] Appl. No.: 287,326

[22] Filed: Dec. 21, 1988

[51] Int. Cl.⁵ ............................................. B65G 17/42
[52] U.S. Cl. ................................................ 104/172.3
[58] Field of Search ............... 104/162, 172.1, 172.2, 104/172.3, 172.5, 178

[56] References Cited

U.S. PATENT DOCUMENTS

| 1,256,474 | 2/1918 | Grabowski | 104/172.3 |
| 1,814,262 | 7/1931 | Redford | 104/172.3 |
| 3,596,605 | 8/1971 | Shelstad | 104/172.3 |

FOREIGN PATENT DOCUMENTS 867593  4/1971  Canada .............................. 104/172.3

Primary Examiner—Duane A. Reger

[57] ABSTRACT

A dolly for use on a chain conveyer in moving an object over a pair of spaced rails comprising: a shaft having two ends, pusher structure mounted on said shaft intermediate said ends for pushing said object over said rails without rotational movement of said pusher structure, said pusher structure including connecting means for connecting said pusher structure to said chain conveyer; and roller removably secured to said ends of said shaft for rotation about said shaft, said rollers adapted to engage said rails.

17 Claims, 5 Drawing Sheets

FIXED PUSHER DOLLIE

FIELD OF INVENTION

This invention relates to a dolly for use on a chain conveyer for moving an object over a pair of spaced rails and in particular relates to a dolly for use on a car wash chain conveyer to contact the wheel of a vehicle so as to move a vehicle over a pair of spaced rails.

BACKGROUND TO THE INVENTION

Various car washing systems have heretofore been devised and constructed so that the owner of a vehicle may easily wash such vehicle. One such car wash system comprises driving a vehicle to the entrance of a car wash and aligning the wheels of the vehicle with two sets of tracks each having a pair of spaced rails. The transmission of the vehicle is placed in neutral and a dolly secured to a drive chain is moved into position so as to engage the rear portion of a tire or a wheel of the vehicle. The dolly includes rollers which are supported for rotation along the track as the chain conveyer is pulled so as to move the wheel of the vehicle forward along the path of the track.

A number of dollys have heretofore been devised. For example, U.S. Pat. No. 4,194,449 relates to a double dolly comprising a first roller which rotates about a first axle, a rotatable safety bar located in advance of and below the lower reach of the first roller and a frame for securing the rollers, axles and safety bars to a conveyer.

Moreover, U.S. Pat. No. 3,455,250 discloses a rotatable roller.

Furthermore, U.S. Pat. No. 3,568,606 discloses a conveyer for urging an automobile along a path of movement which includes a train driven roller arrangement which has a freely rotatable idler roller in pushing contact with the automobile wheel and thus permits unimpeded rotation of the automobile wheel during movement of the automobile along the path of movement.

U.S. Pat. No. 3,596,605 relates to a conveyer mechanism for moving a car through an automatic car wash comprising a plurality of space driven unit assemblies fastened to a drive chain.

Finally, U.S. Pat. No. 3,260,219 discloses a conveyer structure used in an automobile car wash.

Such dolly structures are relatively complicated and tend to wear out after a relatively short period of time.

It is an object of this invention to provide for an improve dolly having improved wear characteristics. More particularly, it is an object of this invention to provide for a dolly having a pusher structure adapted to push the wheel of a vehicle whereby said pusher structure has fewer wear or fatigue points than disclosed in the prior art.

A dolly for use on a car wash chain conveyer for contacting a wheel of a vehicle and moving said vehicle over a pair of spaced rails comprising: a shaft having two threaded ends; connecting means having a hole therethrough for axially receiving said shaft, said connecting means including link means for linking said connecting means to said chain conveyor, said link means adapted to extend between said rails for connection to said chain conveyor; pusher means having a pair of spaced side walls connected to a cylindrical surface, said cylindrical surface having an opening for receiving a portion of said connecting means having said hole therethrough, said pusher means including aperture means in said side walls aligned with said hole of said connecting means for axially receiving said shaft therethrough; sleeve means disposed within said opening of said pusher means between said side walls and said connecting means, said sleeve means adapted to receive said shaft means; roller means disposed at said ends of said shaft for rotation about said shaft, said roller means, adapted to engage said rails, said roller means including bore means extending therethrough and presenting shoulder means; bushing means disposed interiorially of said bore means of said roller means, said bushing means adapted to receive said shaft means for relative rotation therebetween; first washer means disposed between said side walls and said bushing means said first washer means adapted to receive said shaft means for relative rotation there between; second washer means disposed within said bore means for contact with said shoulder means said second washer means adapted to receive said shaft means for relative rotation therebetween; locking means threadedly engageable with said threaded ends of said shaft for securing said first washer means, bushing means, second washer means, side walls, sleeve means and said connecting means together, for securing said roller means for rotation about said shaft; said connecting means including a bearing surface for contacting said pusher means when said pusher means pushes said wheel of said vehicle so as to prevent rotation of said pusher means as said chain conveyor pulls said connecting means.

Another aspect of this invention relates to a dolly for use on a chain conveyer in moving an object over a pair of spaced rails comprising: a shaft having two ends, a connector releasably secured to said shaft and adapted to extend between said spaced rails for connection to said chain conveyer; rollers removably secured to said ends of said shaft for rotation about said shaft, said rollers adapted to engage said rails; and pusher structure removably fixedly secured to said shaft and said connector said connecting means, including a bearing surface for contacting said pusher means when said pusher means pushes said object so as to prevent rotation of said pusher means as said chain conveyor pulls said connecting means.

It is another aspect of this invention to provide for a dolly for use on a car wash chain conveyer for contacting the wheel of a vehicle and moving said vehicle over a pair of spaced rails, comprising: a shaft having two threaded ends; a connector having a hole therethrough for axially receiving said shaft, said connector including link structure for linking said connector to said chain conveyer; said link structure adapted to extend between said rails for connection to said chain conveyer; pusher structure having an opening for receiving a portion of said connector having said hole therethrough, said pusher structure including aperture means aligned with said hole of said connector for axially receiving said shaft therethrough, rollers disposed at said ends of said shaft for rotation about said shaft, said rollers adapted to engage said rails; locking structure threadedly engagable with said threaded ends of said shaft for securing said rollers for rotation about said shaft and for securing said pusher structure and said connector to said shaft said connector including a bearing surface adjacent said opening for contacting said pusher when said pusher pushes said wheel of said vehicle so as to prevent rotation of said pusher as said chain conveyor pulls said connector.

DRAWINGS

These and other objects and features shall now be described in relation to the following drawings.

DESCRIPTION OF THE INVENTION

Like parts shall be given like numbers throughout the figures.

Figure 1:
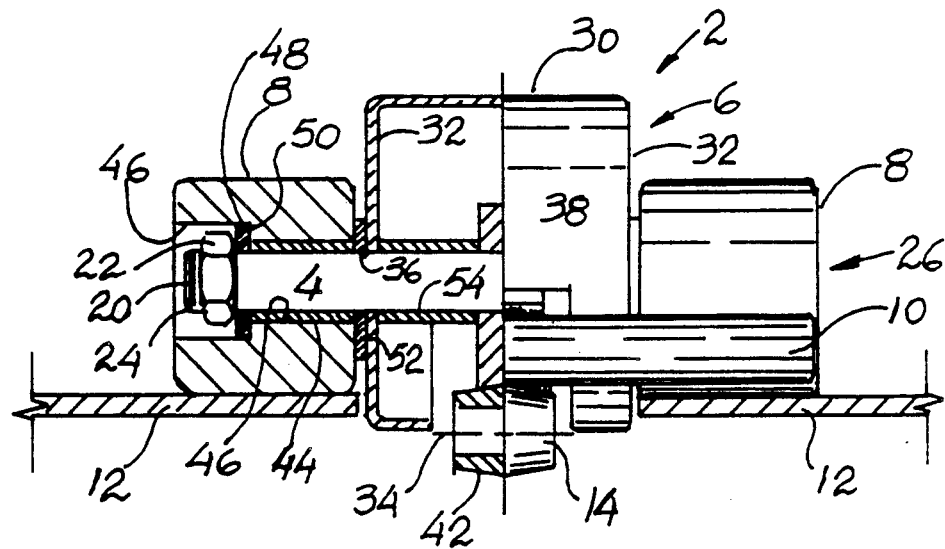
FIG. 1 is a half sectional front elevational view of the dolly.
Figure 2:
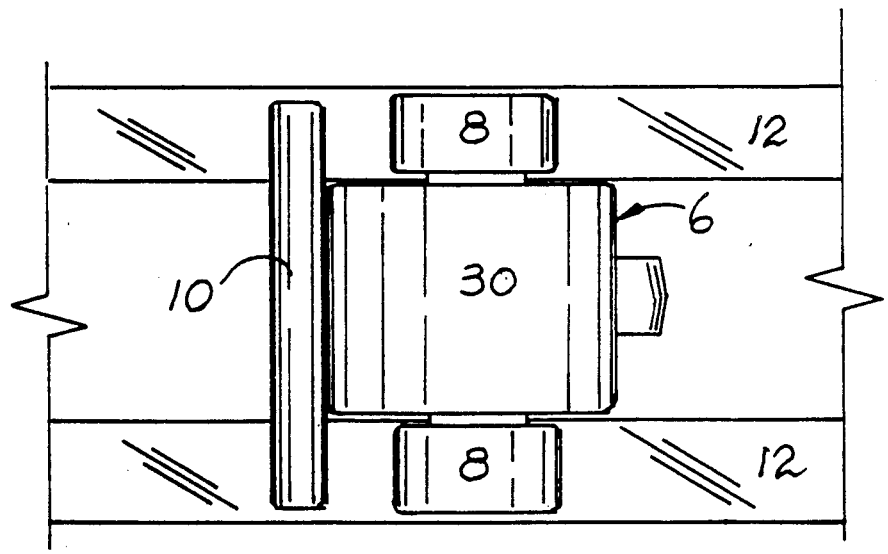
FIG. 2 is a top plan view of the dolly.
Figure 3:
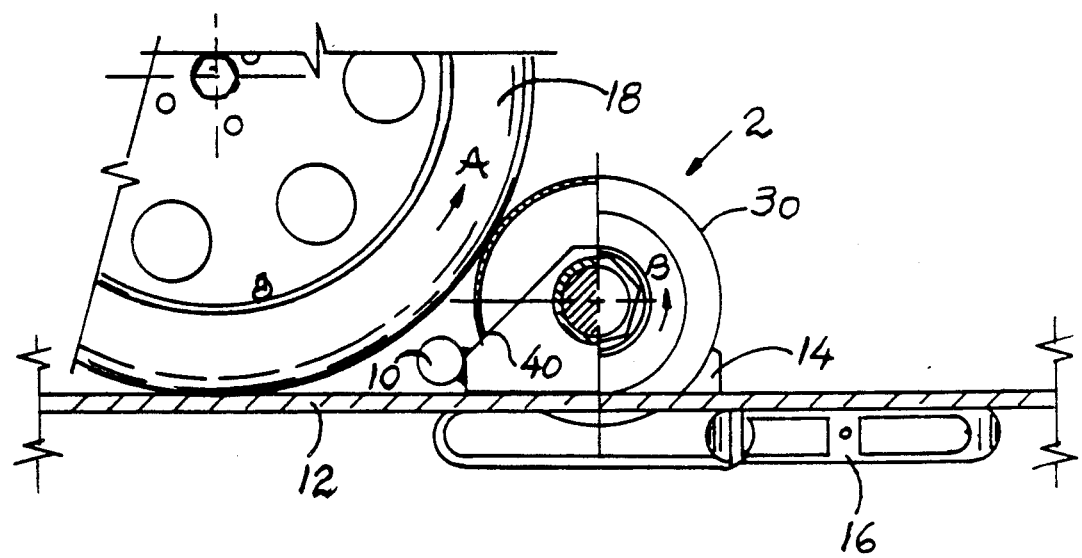
FIG. 3 is a half sectional side elevational view of said dolly engaging the wheel of a vehicle.

FIGS. 1, 2 and 3 relate to one embodiment of the invention and disclose a dolly generally depicted as 2. Such dolly includes a shaft 4, a pusher 6, a pair of rollers 8 and a safety bar 10. The rollers 8 are adapted for rotational movement about shaft 4 and the rollers 8 are supported by a pair of spaced rails 12.

Figure 4:
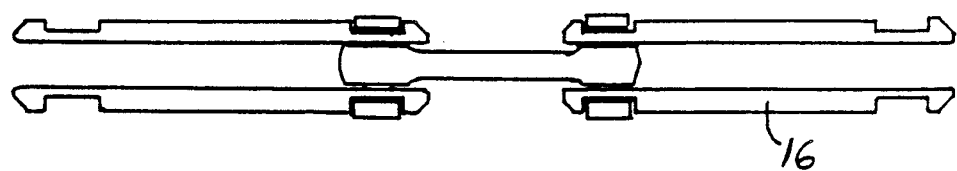
FIG. 4 is a top plan view of a car wash chain conveyer.

The dolly 2 also includes a connecting means or structure 14 which is adapted for connection to a chain conveyer 16 as best illustrated in FIGS. 3 and 4.

More particularly a vehicle (not shown) is driven to the entrance of a car wash station (not shown) having a set of tracks each of which comprise a pair of spaced rails 12. The wheels or tire 18 of the vehicle are aligned with the tracks comprising a pair of spaced rails 12 and the dolly 2 is moved by the chain conveyer 16 so as to engage the rear portion of the wheel 18 as best illustrated in FIG. 3. The dolly 2 is pulled by chain conveyer 16 which is located between and substantially below the rails 12 so as to move the wheel 18 and therefore the vehicle through the car wash in the manner to be more fully described herein.

The dolly 2 includes a shaft 4 which may be made of any material having sufficient strength and in the preferred embodiment comprises 1045 steel. The shaft 4 has two ends 20 and 26 which have threads 20. Threads 20 are adapted to threadedly lockingly receive lock nuts 22 at both ends 24 and 26 of shaft 4.

The dolly includes pusher means 6 which comprises a pusher structure having a cylindrical outer surface 30 which is adapted to contact and push against the wheel or tire 18 of a vehicle as best illustrated in FIG. 3. The pusher structure 6 also includes a pair of side walls 32 which are integral with the cylindrical surface 30 as illustrated in FIG. 1. Such side walls 32 may either be comprises of one piece of material or may comprise of several separate pieces of material which are connected together such as welding or the like in a manner well known to those persons in the art. The pusher structure 30 includes an opening 34 which is adapted to receive the connecting means or structure 14 in a manner to be described herein. The pusher 6 also includes hole or aperture 36 in each of the side walls 32 which are aligned so as to receive the shaft as best illustrated in FIG. 1.

The connecting means or structure 14 is adapted to extend into the opening 34 of pusher 6 and includes a hole or aperture 38 which aligns with holes 36 of side walls 32 in a manner so as to receive the shaft 4 axially therethrough. The connecting structure 14 is adapted to contact pusher 6 at contact points 40. The connecting structure 14 also includes link means or structure 42 which is adapted to connect or link up with chain conveyer 16 as illustrated in FIG. 3.

The rollers 8 each include a first bore 44 having a first interior diameter and a second bore 47 having a second interior diameter which is larger than said first interior diameter of first bore 44. The first bore 44 is adapted to receive a bushing 46 which is generally comprised of steel. The shaft 4 is adapted to be inserted into second bore 47 and first bore 44 and bushing 47. A washer 48 is adapted to be disposed within second bore 46 so as to rest against shoulder 50. A washer 52 is located between rollers 8 and side wall 32 of pusher means 6.

The washer 52 is adapted to bear against bushing 46 and side wall 32 of pusher 6 so that rollers 8 may freely rotate about shaft 4. The pusher 6 also includes a sleeve 54 which is adapted to bear against connecting structure 14 and side wall 32 of pusher structure 2. The sleeve 54 is adapted to receive the shaft 4.

The internal structure of dolly 2 disclosed in FIG. 1 is symmetrical and accordingly the assembly of dolly 2 shall now be described. The connecting structure 14 is placed within opening 34 of pusher structure 6 so that the hole 38 of connecting structure 14 aligns with holes 36 of side wall 32 of pusher structure 6. Sleeves 54 are also inserted into the opening 34 of pusher 6 so as to bear against side walls 32 and connecting structure 38. Shaft 4 is then inserted into holes 36 of side walls 32 through sleeve 54 and through hole 38 of connecting structure 14. Thereafter washers 36 are placed over shaft 4 and rollers 8 disposed over the ends of shaft 4. Locking nut 22 is then threadedly secured to the threaded ends 24 and 26 of shaft 4 so as to rigidly clamp washer 48, bushing 46, washer 52 side wall 32, sleeve 54 and connector 14 together as a unit; while allowing roller 8 to rotate about shaft 4. Thereafter the chain conveyer 16 is connected to the linking structure 42 of connector 14 in a manner well known to those persons skilled in the art.

The rollers 8 are adapted for rotation about shaft 4 and are supported by spaced rails 12 as the chain conveyer pulls dolly 2 against the rear portion of a tire 18. The cylindrical surface 30 of pusher 6 is adapted to bear against the tire 18 and to push the tire and therefore the vehicle along the rails 12 and through the car wash.

The pusher 6 does not rotate as pusher 6 pushes the wheel 18. Accordingly there are few wear or fatigue points which are subject to wearing out. More particularly the pusher 6 contacts the connecting structure 14 at contact points 40 which prevents the pusher from rotating as it pushes the tire 18. As the pusher 6 pushes tire 18 the tire 18 rotates in the direction of arrow A while the rollers 8 rotate in the direction of arrow B. Pusher 6 does not rotate.

A safety bar 10 is connected to the connecting structure 14 by a variety of means including welding as shown in FIG. 3. The safety bar 10 does not rotate and is disposed in advance of the pusher 6. The safety bar 10 is adapted to push away a foot or other appendage of a person who may inadvertently place same in the direction of travel of the dolly along rails 12. The safety bar 10 is comprised of 1045 steel.

The rollers 8 may be comprised of any suitable material designed to withstand the load characteristics and in the preferred embodiment comprises of a synthetic material identified under the trade mark Delrin.

The pusher 6 disclosed in FIG. 1, 2 and 3 extends into and between the space between rails 12.

Figure 5:
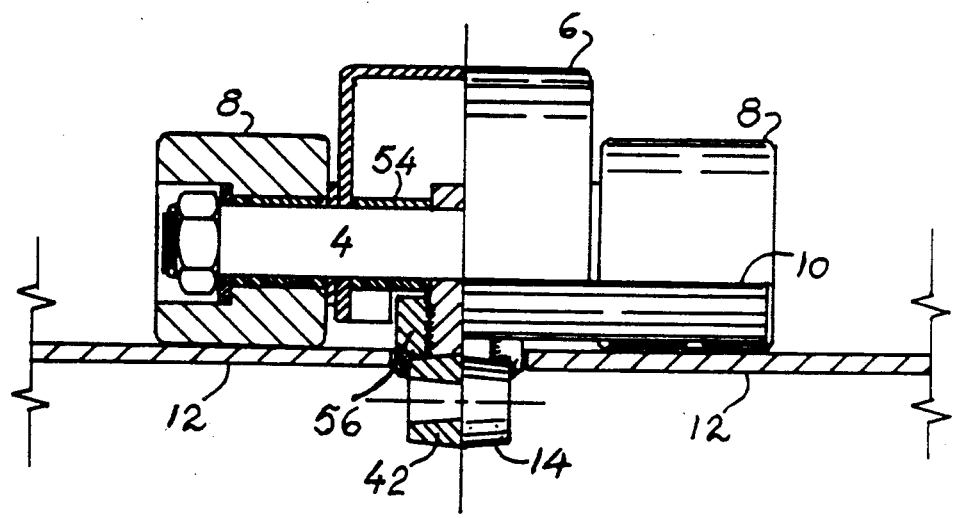
FIG. 5 is a half sectional front elevational view of another embodiment of the dolly.
Figure 6:
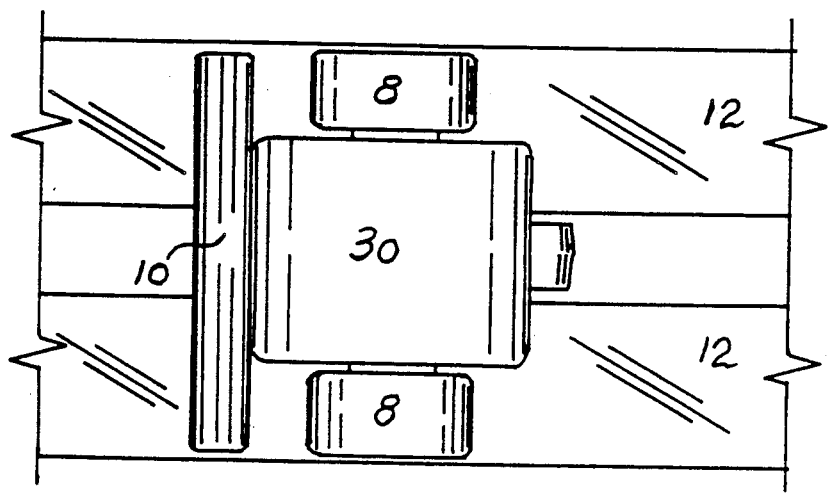
FIG. 6 is a top plan view of the dolly disclosed in FIG. 5.
Figure 7:
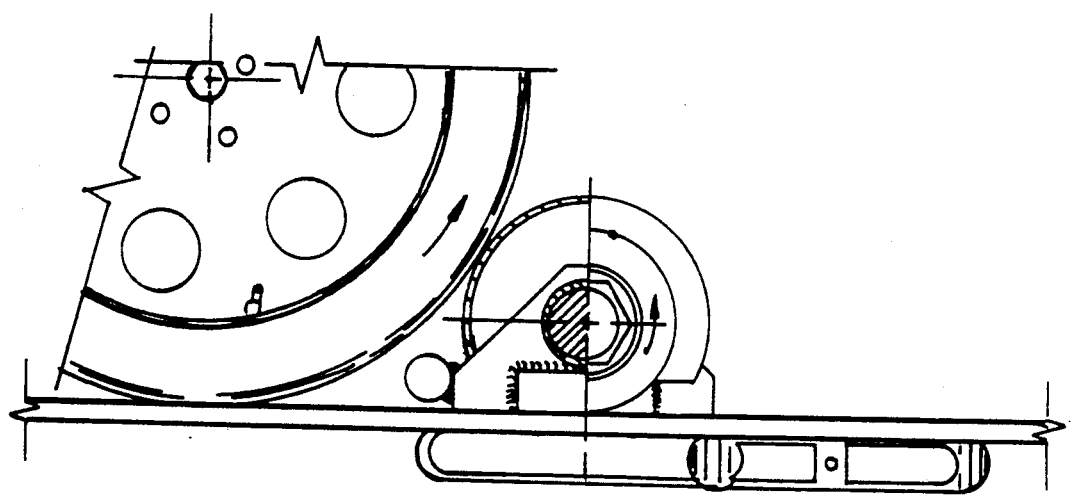
FIG. 7 is a half sectional side elevational view of said dolly disclosed in FIG. 5.

The embodiment disclosed in FIGS. 5, 6 and 7 are similar to the embodiment disclosed in FIGS. 1, 2 and 3 except that the rails 12 are spaced closer to one another. More particularly, the spacing in the rails in FIG. 1 is typically in the order of 4 inches while the rails 12 in FIG. 5 are spaced approximately 2¼ inches apart. Accordingly there is less likelihood of a users foot or other appendage to inadvertently be placed into the opening between rails 12 of FIG. 5 since such opening has been diminished. In any event the safety bar 10 of FIG. 5 is adapted to push away the foot of a user should it be inadvertently placed on rails 12.

Since the rails are spaced closer together in FIG. 5 pusher 6 has been adapted so that the lower portion of pusher 6 has been removed so that pusher structure 6 is located above rails 12.

Finally the connecting structure 14 includes a reenforcing plate 56 which is welded to the link structure 42 and connecting structure 14 so as to regidify and strengthen such part.

Figure 8:
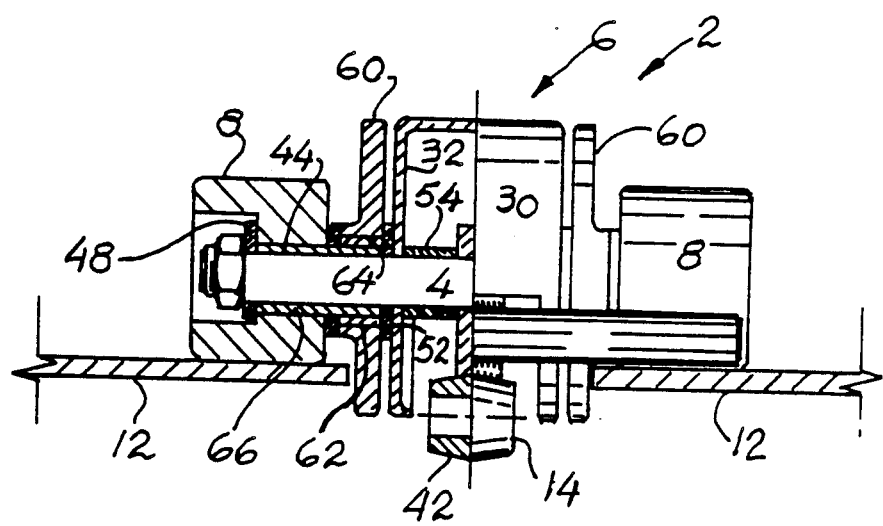
FIG. 8 is a half sectional front elevational view of yet another embodiment of the dolly.
Figure 9:
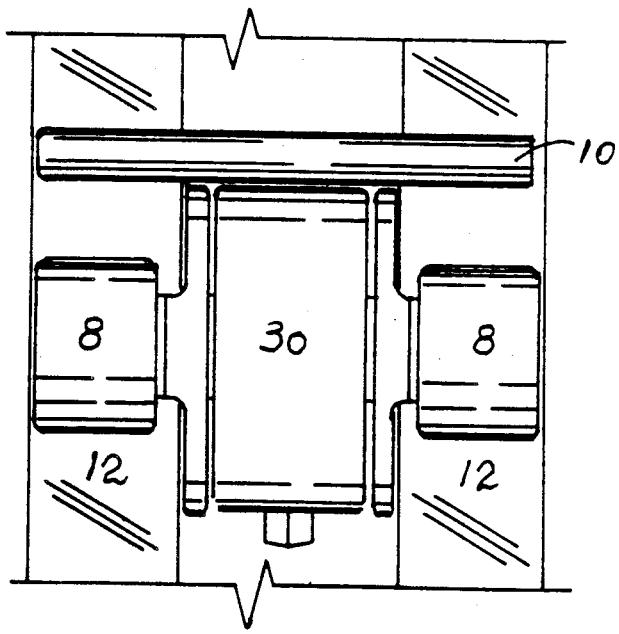
FIG. 9 is a top plan view of the dolly disclosed in FIG. 8.
Figure 10:
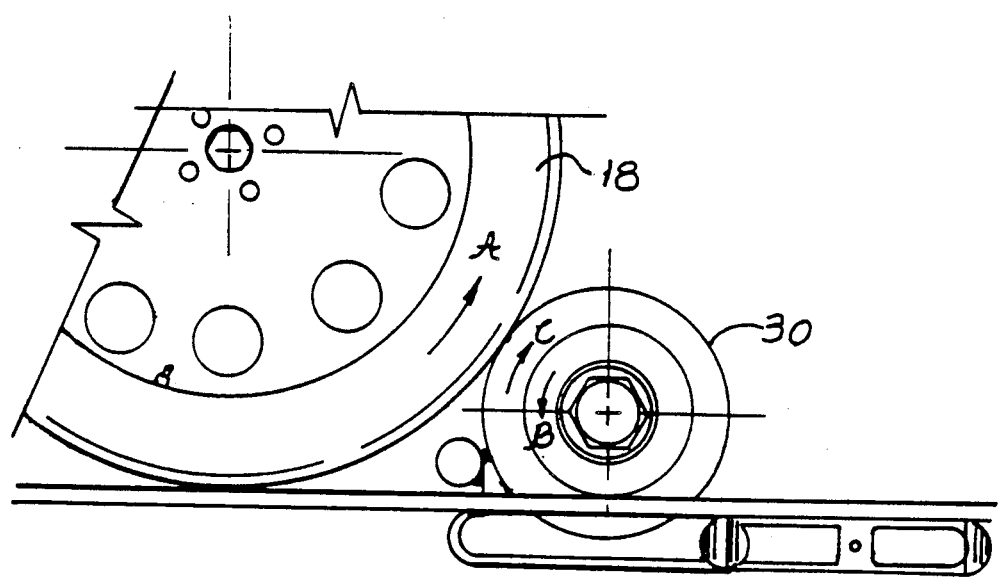
FIG. 10 is a half sectional side elevational view of the dolly disclosed in FIG. 8.

FIGS. 8, 9 and 10 disclose a third embodiment of the invention. Such third embodiment is similar to the embodiment disclosed in FIGS. 1, 2 and 3 except that a pair of pusher rollers 60 have been included. The pusher rollers 60 are disposed between pusher structure 6 and rollers 8.

The pusher rollers 60 include a bore 62 extending therethrough. The pusher rollers 60 include a bushing 64 which can be comprised of a variety of metals but in the preferred embodiment is comprised of bronze. The bushing 66 extends from first bore 44 of roller 8 through bore 62 of pusher roller 60 between washers 48 and 52. Pusher roller 60 is adapted to freely rotate about shaft 4. The pusher 6 disclosed in FIG. 8 however does not rotate. Accordingly when the dolly 2 of FIG. 8 is brought into contact with wheel 18 the pusher rollers 60 may freely rotate about shaft 4 while pusher 60 bears against and pushes the wheel 18 of a vehicle.

It has been found that by using the dolly disclosed herein the dollys have a longer service life between repairs compared to the dollys used in the prior art as the wear characteristics of the pusher means 6 has fewer wear or fatigue points then compared with the dollys of the prior art.

Furthermore, the dolly 2 has disclosed herein may be easily and quickly disassembled and assembled should a component part need to be repaired.

The metal portions of dolly 2 may be coated with a suitable material such as zinc so as to minimize oxidation or rusting of same, or alternatively such dolly may be comprised of materials having little or no rusting characteristics.

While the salient features of the invention have been illustrated and described, it should be readily apparent to those skilled in the art that changes in modifications can be made in the invention presented without departing from the spirit and scope of the invention. Accordingly the present invention should be considered as encompassing also such changes and modifications that are within the broad scope of the invention as disclosed in the appended claims.

The embodiments of the invention in which an exclusive property or privilege is claimed are defined as follows:

1. A dolly for use on a car wash chain conveyor for contacting a wheel of a vehicle and moving said vehicle over a pair of spaced rails comprising:
    (a) a shaft having two threaded ends;
    (b) connecting means having a hole therethrough for axially receiving said shaft, said connecting means including link means for linking said connecting means to said chain conveyor, said link means adapted to extend between said rails for connection to said chain conveyor;
    (c) pusher means having a pair of spaced side walls connected to a cylindrical surface, said cylindrical surface having an opening for receiving a portion of said connecting means having said hole therethrough, said pusher means including aperture means in said side walls aligned with said hole of said connecting means for axially receiving said shaft therethrough;
    (d) sleeve means disposed within said opening of said pusher means between said side walls and said connecting means, said sleeve means adapted to receive said shaft means;
    (e) roller means disposed at said ends of said shaft for rotation about said shaft, said roller means, adapted to engage said rails, said roller means including bore means extending therethrough and presenting shoulder means;
    (f) bushing means disposed interiorially of said bore means of said roller means, said bushing means adapted to receive said shaft means for relative rotation therebetween;
    (g) first washer means disposed between said side walls and said bushing means said first washer means adapted to receive said shaft means for relative rotation there between;
    (h) second washer means disposed within said bore means for contact with said shoulder means said second washer means adapted to receive said shaft means for relative rotation therebetween;
    (i) locking means threadedly engageable with said threaded ends of said shaft for securing said first washer means, bushing means, second washer means, side walls, sleeve means and said connecting means together, for securing said roller means for rotation about said shaft;
    (j) said connecting means including a bearing surface for contacting said pusher means when said pusher means pushes said wheel of said vehicle so as to prevent rotation of said pusher means as said chain conveyor pulls said connecting means.

2. A dolly for use on a chain conveyer in moving an object over a pair of spaced rails comprising: a shaft having two wends, connecting means releasably secured to said shaft and adapted to extend between said spaced rails for connection to said chain conveyer; roller means removably secured to said ends of said shaft for rotation about said shaft, said roller means adapted to engage said rails; and pusher means removably fixedly secured to said shaft and said connecting means; said connecting means including a bearing surface for contacting said pusher means when said pusher means pushes said object so as to prevent rotation of said pusher means as said chain connveyorpulls said connecting means.

3. A dolly as claimed in claim 2 wherein said pusher means is disposed between said roller means.

4. A dolly as claimed in claim 3 including safety bar means.

5. A dolly as claimed in claim 4 wherein said safety bar means is secured to said connecting means.

6. A dolly as claimed in claim 5 wherein said pusher means has an opening and said connecting means extends into said opening of said pusher means.

7. A dolly as claimed in claim 6 wherein said pusher means and said connecting means each include aligned holes for receiving said shaft therethrough.

8. A dolly as claimed in claim 7 wherein said shaft includes thread means at said ends of said shaft, and further including lock nut means for threadedly securing said roller means to said shaft.

9. A dolly as claimed in claim 8 wherein said pusher means extends into said space between said rails.

10. A dolly as claimed in claim 9 further including pusher roller means disposed between said pusher means and said roller means, said pusher roller means adapted to contact and push said object.

11. A dolly as claimed in claim 8 wherein said pusher means is disposed above said rail means.

12. A dolly for use on a car wash chain conveyer for contacting a wheel of a vehicle and moving said vehicle over a pair of spaced rails comprising:
(a) a shaft having two threaded ends;
(b) connecting means having a hole therethrough for axially receiving said shaft, said connecting means including link means for linking said connecting means to said chain conveyer, said link means adapted to extend between said rails for connection to said chain conveyer;
(c) pusher means having an opening for receiving a portion of said connecting means having said hole therethrough, said pusher means including aperture means aligned with said hole of said connecting means for axially receiving said shaft therethrough;
(d) roller means disposed at said ends of said shaft for rotation about said shaft, said roller means adapted to engage said rails;
(e) locking means threadedly engageable with said threaded ends of said shaft for securing said roller means for rotation about said shaft and for securing said pusher means and said connecting means to said shaft;
(f) said connecting means including a bearing surface adjacent said opening for contacting said pusher means where said pusher means pushes said wheel of said vehicle so as to prevent rotation of said pusher means as said chain conveyor pulls said connecting means.

13. A dolly as claimed in claim 12 further including a safety bar secured to said connecting means in advance of said pusher means.

14. A dolly as claimed in claim 13 wherein said pusher means extends into said space between said rails.

15. A dolly as claimed in claim 14 where said pusher means is disposed above said rails.

16. A dolly as claimed in claim 13 further including pusher roller means disposed between said pusher means and said roller means, said pusher roller means adapted to contact and push said wheels of said vehicle.

17. A dolly for use on a chain conveyor in moving an object over a pair of spaced rails comprising: a shaft having two ends, connecting means releaseably secured to said shaft and adapted to extend between said spaced rails for connection to said chain conveyor; roller means removeably secured to said ends of said shaft for rotation about said shaft, said roller means adapted to engage said rails; pusher means disposed between said roller means, said pusher means including an opening, said connecting means extending into said opening of said pusher means where said connecting means and said pusher means each include aligned holes for receiving said shaft therethrough; safety bar means secured to said connecting means; pusher roller means disposed between said pusher means and said roller means, said pusher roller means adapted to contact and push said object; said pusher means and said roller means, said pusher roller means adapted to contact and push said object; said pusher means at said ends of such shaft, and further including lock nut means for threadedly securing said roller means to such shaft so that said pusher means and said pusher roller means push said object over said rails without rotational movement of said pusher means when said connecting means is moved by said chain conveyor so as to move said object along said rails.

* * * * *